United States Patent
Wei et al.

(10) Patent No.: US 11,777,218 B2
(45) Date of Patent: Oct. 3, 2023

(54) ANTENNA DESIGN WITH STRUCTURALLY INTEGRATED COMPOSITE ANTENNA COMPONENTS

(71) Applicant: Google LLC, Mountain View, CA (US)

(72) Inventors: Ling-Chen Wei, New Taipei (TW); Wei-Yang Wu, New Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/563,226

(22) Filed: Dec. 28, 2021

(65) Prior Publication Data

US 2022/0123472 A1    Apr. 21, 2022

Related U.S. Application Data

(60) Provisional application No. 63/293,950, filed on Dec. 27, 2021.

(51) Int. Cl.
*H01Q 9/04*      (2006.01)
*H01Q 5/25*      (2015.01)
(Continued)

(52) U.S. Cl.
CPC ............ *H01Q 9/0414* (2013.01); *H01Q 5/25* (2015.01); *H01Q 5/364* (2015.01); *H04N 23/57* (2023.01)

(58) Field of Classification Search
CPC ........ H01Q 9/0414; H01Q 5/364; H01Q 5/25; H01Q 1/243; H01Q 21/29; H04N 23/57
See application file for complete search history.

(56) References Cited

U.S. PATENT DOCUMENTS 4,643,509 A * 2/1987 Hollyday ............. H01R 13/648
                                                    439/607.34
5,309,336 A * 5/1994 Hartt ................... F21V 21/0965
                                                    362/183
(Continued)

FOREIGN PATENT DOCUMENTS

EP    3065219 A1 *  9/2016  ............. G01S 19/32
EP    3474379 A1 *  4/2019  ........... H01Q 1/1207
(Continued)

OTHER PUBLICATIONS

Rahim, "Advance Antenna Technology Design", Jan. 2007, 220 pages.
(Continued)

*Primary Examiner* — Dimary S Lopez Cruz
*Assistant Examiner* — Jordan E. DeWitt
(74) *Attorney, Agent, or Firm* — Colby Nipper PLLC (57) ABSTRACT

This document describes techniques and apparatuses directed at antenna designs with structurally integrated composite antenna components. In aspects, an electronic device includes a mechanical frame having housing components configured to house electronic components. The electronic device further includes a composite antenna having at least one set of co-located antenna patches forming two resonance frequencies. The set of antenna patches includes an upper patch and a lower patch. The upper patch is formed integral to a housing component and operably connected to a feedline and an electrical ground. The lower patch is implemented in a flexible printed circuit board positioned proximately beneath the upper patch and operably connected to the upper patch through the feedline, as well as the electrical ground.

9 Claims, 8 Drawing Sheets

(51) Int. Cl.
*H01Q 5/364* (2015.01)
*H04N 23/57* (2023.01)

(56) References Cited

U.S. PATENT DOCUMENTS

| | | | | |
|---|---|---|---|---|
| 5,841,402 | A * | 11/1998 | Dias | H01Q 1/243 343/702 |
| RE36,030 | E * | 1/1999 | Nadeau | H01R 25/14 439/115 |
| 5,940,037 | A * | 8/1999 | Kellerman | H01Q 9/0414 343/700 MS |
| 6,518,924 | B1 * | 2/2003 | Desclos | H01Q 9/0407 343/846 |
| 6,714,162 | B1 * | 3/2004 | Kadambi | H01Q 9/0421 343/846 |
| 6,806,840 | B2 * | 10/2004 | Hung | H01Q 1/2275 343/702 |
| 6,943,738 | B1 * | 9/2005 | Mattsson | H01Q 1/243 343/700 MS |
| 8,463,179 | B2 * | 6/2013 | Mohammadian | H01Q 1/246 343/893 |
| 8,525,737 | B2 * | 9/2013 | Rho | H01Q 9/0421 343/702 |
| 8,766,867 | B2 * | 7/2014 | Ying | H01Q 5/378 343/700 MS |
| 9,831,566 | B2 * | 11/2017 | Delestre | H01Q 9/0407 |
| 9,843,102 | B2 * | 12/2017 | Lai | H01Q 19/005 |
| 11,121,469 | B2 * | 9/2021 | Paulotto | H01Q 21/22 |
| 2004/0000428 | A1 * | 1/2004 | Lii | H01L 23/49816 257/772 |
| 2005/0206568 | A1 * | 9/2005 | Phillips | H01Q 5/40 343/700 MS |
| 2007/0096997 | A1 * | 5/2007 | Nishikawa | H01Q 1/22 343/702 |
| 2009/0002248 | A1 * | 1/2009 | Zhao | H01Q 13/10 343/722 |
| 2009/0195477 | A1 * | 8/2009 | Thiam | H01Q 21/30 343/893 |
| 2009/0256758 | A1 * | 10/2009 | Schlub | H01Q 5/40 343/702 |
| 2010/0069017 | A1 * | 3/2010 | Yamamoto | H01Q 9/16 343/702 |
| 2010/0289701 | A1 * | 11/2010 | DeJean | H01Q 9/0414 343/700 MS |
| 2010/0321253 | A1 * | 12/2010 | Ayala Vazquez | H01Q 13/18 343/702 |
| 2011/0068985 | A1 * | 3/2011 | Hillersborg | H01Q 1/244 343/702 |
| 2012/0291247 | A1 * | 11/2012 | Wang | H01Q 1/243 29/281.1 |
| 2015/0130661 | A1 * | 5/2015 | Desclos | H01Q 3/44 342/368 |
| 2015/0270610 | A1 * | 9/2015 | Kodama | H04W 88/02 343/702 |
| 2016/0352007 | A1 * | 12/2016 | Gu | H01Q 1/42 |
| 2017/0105300 | A1 * | 4/2017 | Howard | H05K 5/0247 |
| 2018/0226718 | A1 * | 8/2018 | Anderson | H01Q 1/1207 |
| 2018/0277934 | A1 | 9/2018 | Kim et al. | |
| 2018/0342808 | A1 * | 11/2018 | Quinlan | H01Q 9/045 |
| 2019/0003694 | A1 * | 1/2019 | Eckert | H01R 12/714 |
| 2019/0006733 | A1 * | 1/2019 | Yasin | H01Q 11/08 |
| 2019/0165476 | A1 * | 5/2019 | Hong | H01Q 21/065 |
| 2019/0312342 | A1 * | 10/2019 | Sautter | H01Q 1/3275 |
| 2019/0319367 | A1 * | 10/2019 | Edwards | H01Q 3/2605 |
| 2020/0036083 | A1 | 1/2020 | Kim et al. | |
| 2020/0259258 | A1 * | 8/2020 | Amiri | H01Q 5/378 |
| 2020/0266539 | A1 * | 8/2020 | Cooper | H01Q 5/243 |
| 2020/0280131 | A1 * | 9/2020 | Avser | H01Q 5/307 |
| 2020/0313284 | A1 * | 10/2020 | Kim | H05K 1/165 |
| 2020/0343626 | A1 * | 10/2020 | Rieder | H01Q 21/065 |
| 2020/0358165 | A1 * | 11/2020 | Jeong | H01Q 21/08 |
| 2021/0050651 | A1 * | 2/2021 | Jung | H01Q 1/38 |
| 2022/0123472 | A1 * | 4/2022 | Wei | H01Q 5/364 |
| 2022/0173790 | A1 * | 6/2022 | Lee | G01S 3/043 |
| 2023/0018781 | A1 * | 1/2023 | Choi | H01Q 21/28 |

FOREIGN PATENT DOCUMENTS

| | | | | |
|---|---|---|---|---|
| EP | 3691227 | | 8/2020 | |
| GB | 2333902 | A * | 8/1999 | H01Q 1/243 |
| WO | WO-0118910 | A1 * | 3/2001 | H01Q 5/0051 |
| WO | WO-0124314 | A1 * | 4/2001 | H01Q 1/243 |
| WO | WO-02065581 | A1 * | 8/2002 | H01Q 1/243 |
| WO | WO-2004047220 | A1 * | 6/2004 | H01Q 1/243 |
| WO | WO-2008148569 | A2 * | 12/2008 | H01Q 1/38 |

OTHER PUBLICATIONS

Su, "Two-patch-pifa System with Comparable Polarization Radiation for Tablet-Computer Applications with Complete, Metal Back Cover", Dec. 2013, pp. 2815-2821.

* cited by examiner

ANTENNA DESIGN WITH STRUCTURALLY INTEGRATED COMPOSITE ANTENNA COMPONENTS

RELATED APPLICATION

This application claims priority under 35 U.S.C. § 119(e) to U.S. Provisional Patent Application 63/293,950, filed on Dec. 27, 2021 which is incorporated herein by reference in its entirety.

SUMMARY

This document describes techniques and apparatuses directed at antenna designs with structurally integrated composite antenna components. In aspects, an electronic device includes a mechanical frame having housing components configured to house electronic components. The electronic device further includes a composite antenna having at least one set of co-located antenna patches forming two resonance frequencies. The set of antenna patches includes an upper patch and a lower patch. The upper patch is formed integral to a housing component and operably connected to a feedline and an electrical ground. The lower patch is implemented in a flexible printed circuit board positioned proximately beneath the upper patch and operably connected to the upper patch through the feedline, as well as the electrical ground.

This Summary is provided to introduce simplified concepts of systems and techniques directed at antenna designs with structurally integrated composite antenna components, the concepts of which are further described below in the Detail Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects for antenna designs with structurally integrated composite antenna components are described in this document with reference to the following drawings.

The use of same numbers in different instances may indicate similar features or components.

DETAILED DESCRIPTION

Overview

Electronic devices make significant contributions to modern society, such as in the realms of safety, transportation, communication, and manufacturing. Many users desire increasingly thin electronic devices, minimizing space available within electronic devices to house electronic components (e.g., processors). As a result, smaller electronic components are being designed and manufactured to be integrated in thinner electronic devices. However, some electronic components are difficult to implement in smaller sizes due to electromagnetic performance constraints. For example, ultra-wideband technology uses low energy for short-range, high-bandwidth communications over a large portion of the radio spectrum. Designs of ultra-wideband composite antennas are comparatively large due to generally unsatisfactory performance when implemented in smaller packages.

In contrast, this document describes techniques and apparatuses directed at antenna designs with structurally integrated composite antenna components. By integrating composite antenna components into the mechanical structure of an electronic device, the separation between antenna patches can be enlarged to fulfill electronic device size requirements, as well as satisfying ultra-wideband bandwidth requirements.

Although techniques using and apparatuses for antenna designs with structurally integrated composite antenna components are described, it is to be understood that the subject of the appended claims is not necessarily thresholded to the specific features or methods described. Rather, the specific features and methods are disclosed as example implementations and reference is made to the operating environment by way of example only.

Operating Environment

Figure 1:
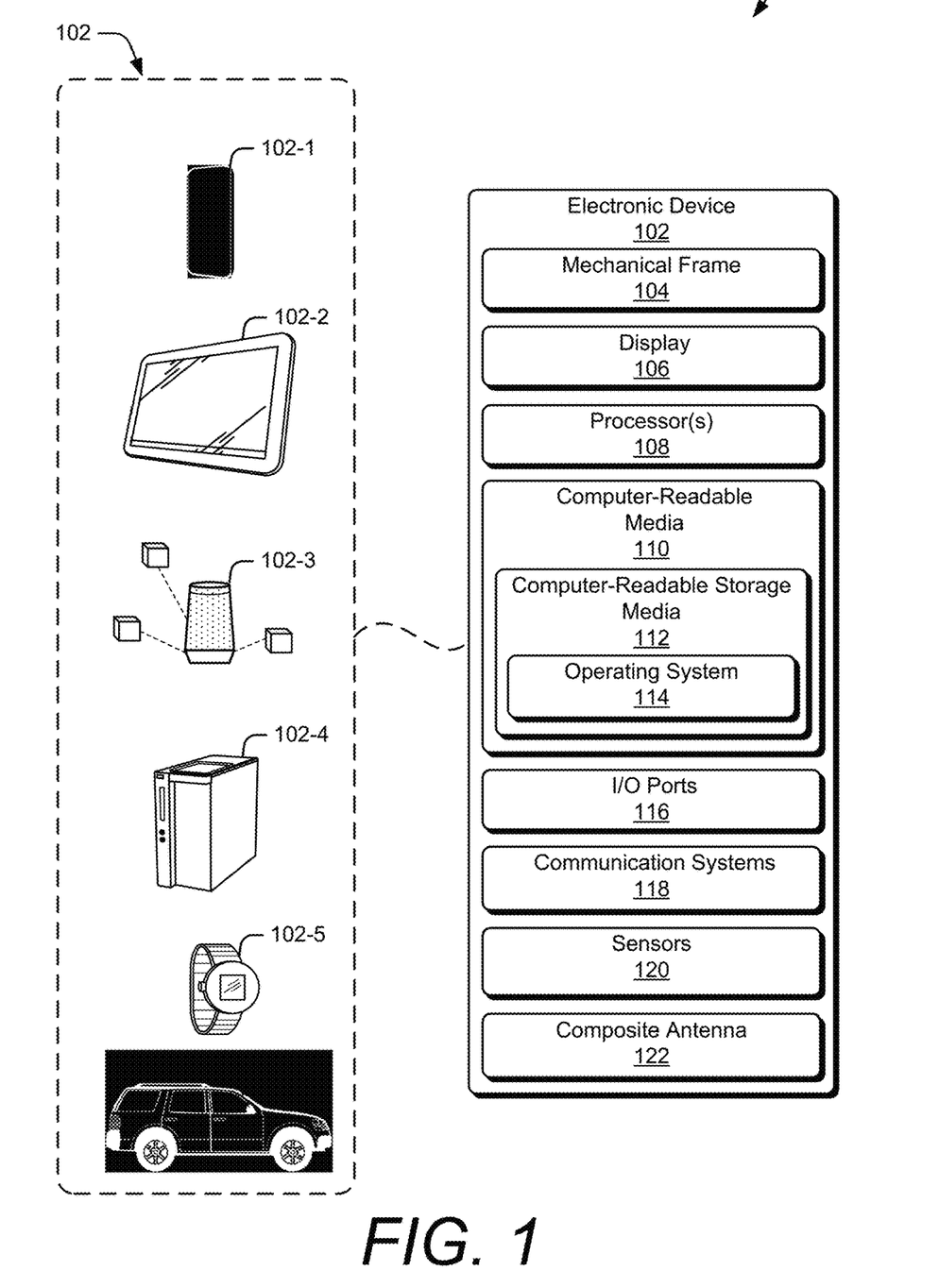
FIG. 1 illustrates an example operating environment that includes example electronic devices having a mechanical frame with an integrated composite antenna component.

FIG. 1 illustrates an example operating environment 100 that includes example electronic devices having a mechanical frame with an integrated composite antenna component. Examples of an electronic device 102 include a smartphone 102-1, a tablet computer 102-2, wireless nodes 102-3, a gaming console 102-4, a wearable electronic device 102-5 (e.g., a computerized watch), and an automobile 102-6. The electronic device 102 may provide other functions or include components or interfaces omitted from FIG. 1 for the sake of clarity or visual brevity.

The electronic device 102 includes a mechanical frame 104 defining a housing having an internal cavity. The mechanical frame 104 may be manufactured and/or assembled with interconnected housing components composed of aluminum, plastic, and so forth. The mechanical frame 104 defining a housing may include one or more openings that house or support a display 106. Although not shown, various human-input devices, a battery pack, and the like can be housed in the internal cavity of the device.

The electronic device 102 also includes, housed within the internal cavity, a printed circuit board assembly (not illustrated) on which components and interconnects of the electronic device 102 may be embodied. Alternatively or additionally, components of the electronic device 102 can be embodied on other substrates, such as flexible circuit material or other insulative material. Generally, electrical components and electromechanical components of the electronic device 102 are assembled onto a printed circuit board (PCB)

to form the printed circuit board assembly (PCBA). In implementations, some electronic components of the electronic device 102 are assembled onto a flexible printed circuit board (FPCB), and the FPCB is connected to the PCBA via wiring. Various electromechanical components (e.g., processors and memories) are then programmed and tested to verify the correct function of the electronic device 102. The PCBA and FPCBs are connected to or assembled with other parts of the electronic device 102.

As illustrated, the electronic device 102 further includes one or more processors 108 and computer-readable media 110. The processor(s) 108 may be any suitable single-core or multi-core processor (e.g., a central processing unit (CPU)). The processor(s) 108 may be configured to execute instructions or commands stored within the computer-readable media 110 to implement an operating system 114, which are stored within computer-readable storage media 112. The computer-readable storage media 112 may include one or more non-transitory storage devices such as a random access memory, hard drive, SSD, or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate and/or interact with each other.

The electronic device 102 may also include I/O ports 116 and communication systems 118. The I/O ports 116 allow the electronic device 102 to interact with other devices or users through peripheral devices, conveying any combination of digital signals, analog signals, and radio-frequency (RF) signals. Various peripherals may be operatively coupled with the I/O ports 116, such as human-input devices (HIDs), external computer-readable storage media, or other peripherals.

The communication systems 118 enable communication of device data, such as received data, transmitted data, or other information as described herein, and may provide connectivity to one or more networks and other devices connected therewith. The communication systems 118 may include wired interfaces, such as Ethernet or fiber-optic interfaces for communication over a local network, private network, intranet, or the Internet. Alternatively or additionally, the communication systems 118 may include wireless interfaces that facilitate communication over wireless networks, such as wireless LANs, cellular networks, or WPANs.

The electronic device 102 further includes one or more sensors 120. The sensor(s) 112 can include any of a variety of sensors, such as an audio sensor (e.g., a microphone), a touch-input sensor (e.g., a touchscreen), an image-capture device (e.g., a camera, video-camera), proximity sensors (e.g., capacitive sensors), or an ambient light sensor (e.g., photodetector).

In aspects, the electronic device 102 includes a composite antenna 122. The composite antenna 122 may be implemented as a transmitter, receiver, or transceiver. In implementations, the composite antenna 122 may be configured to perform techniques of the communication systems 118. For example, the composite antenna 122 converts electric signals to radio waves in order to transmit data. In alternative or additional implementations, the composite antenna 122 may be configured as a sensor (e.g., a radar antenna).

Example Techniques

Figure 2:
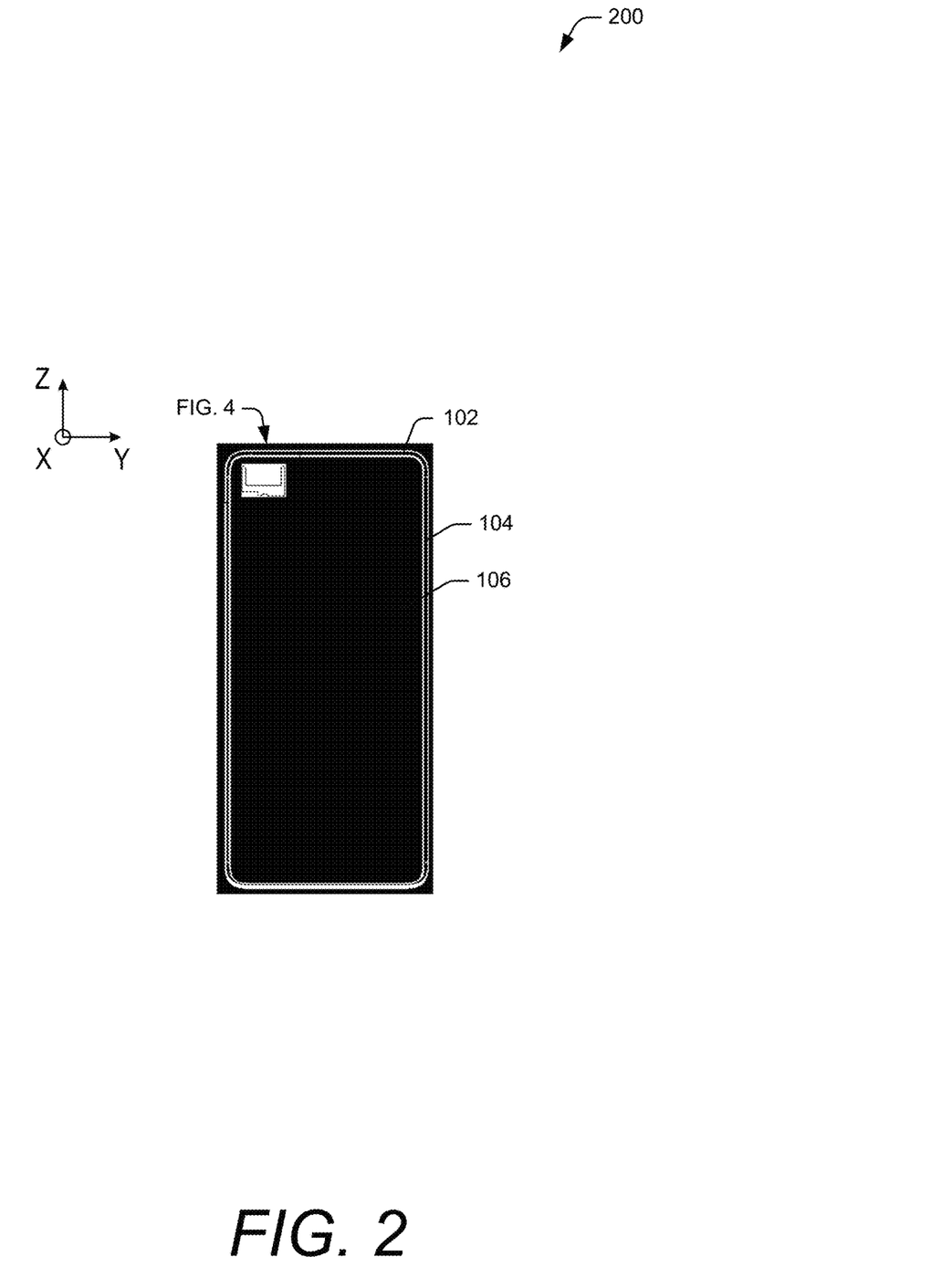
FIG. 2 illustrates a front-facing portion of a first example electronic device having a mechanical frame with an integrated composite antenna component.

FIG. 2 illustrates an example implementation 200 of a front-facing portion of a first example electronic device 102 (e.g., electronic device 102-1) having a mechanical frame with an integrated composite antenna component. FIG. 2 is described in context of FIG. 1, including one or more components of FIG. 1. As illustrated, the electronic device 102 is a smartphone including the mechanical frame 104 and the display 106. The mechanical frame 104 provides an overall shape of the device and further defines the internal cavity, housing the PCBA. The electronic device 102 also includes the composite antenna (not illustrated) having components operably coupled to the PCBA. The composite antenna may be implemented in various locations within the electronic device 102. For example, as indicated by the dashed region in FIG. 2, the composite antenna is implemented within the housing on a top, left-side of the electronic device 102.

Figure 3:
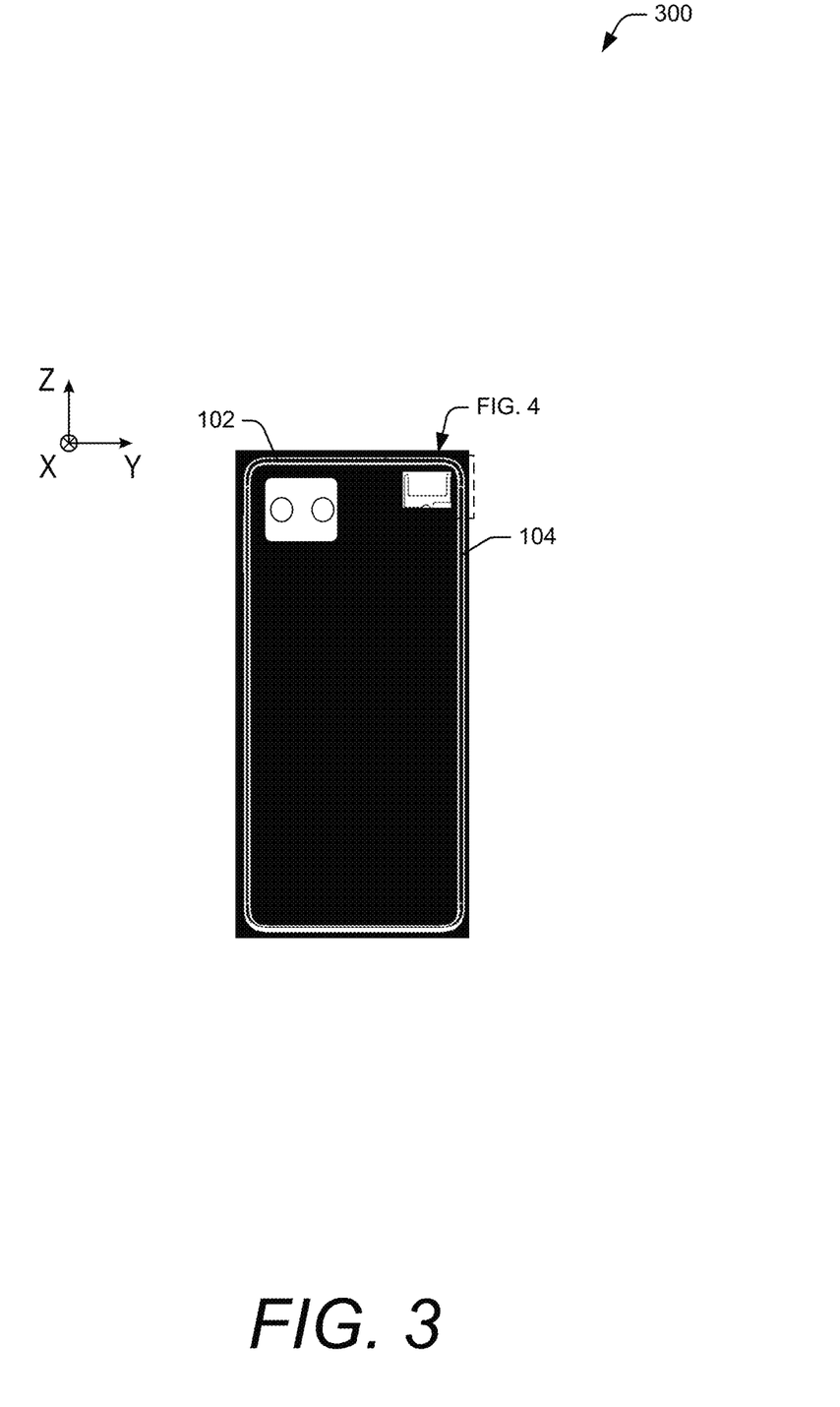
FIG. 3 illustrates a rear-facing portion of the first example electronic device having a mechanical frame with an integrated composite antenna component.

FIG. 3 illustrates an example implementation 300 of a rear-facing portion of the first example electronic device 102 having a mechanical frame with an integrated composite antenna component. FIG. 3 is described in context of FIGS. 1 and 2. As described herein, components referred to as upper or lower are described in context to FIG. 3 until specified otherwise. A component is described as upper if on the x-axis the component is positioned further away from the internal cavity relative to another component. A component is described as lower if on the x-axis the component is positioned closer to or within the internal cavity relative to another component.

Figure 4:
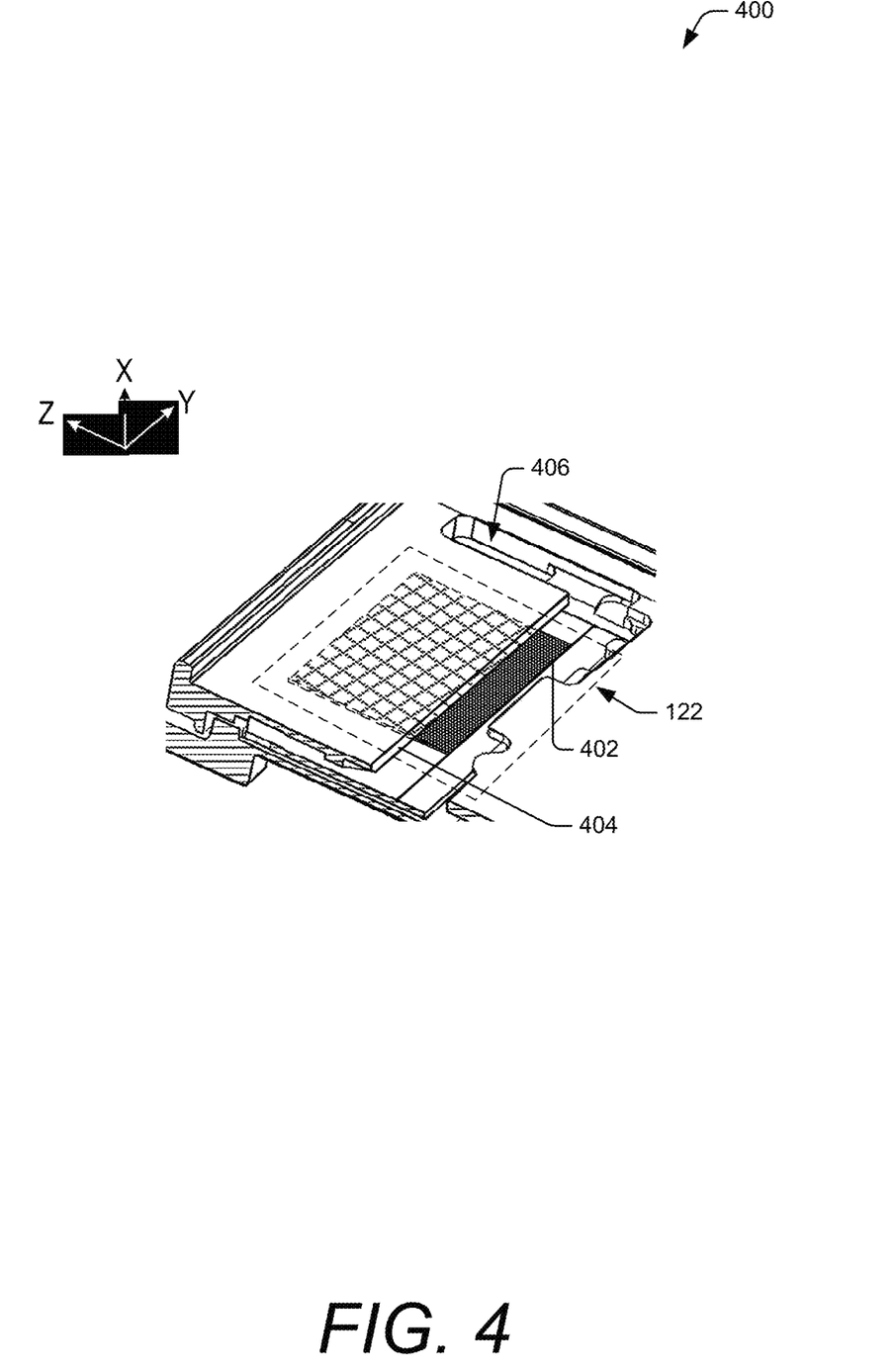
FIG. 4 illustrates a partial, cross-sectional view of the first example electronic device in accordance with one or more aspects described herein.

Turning now to FIG. 4, a partial, cross-sectional view 400 of the first example electronic device 102 is illustrated. As illustrated, the electronic device 102 includes the composite antenna 122 having a set of antenna patches. The composite antenna 122 may be implemented utilizing a patch antenna design (e.g., microstrip antenna, stacked microstrip patch antenna), including planar, geometric-shaped (e.g., rectangular, circular, triangular), co-located sheets of metal ("antenna patches"). In implementations, the electronic device 102 includes a planar inverted-F antenna (PIFA) module having two antenna patches forming two resonance frequencies.

The set of antenna patches includes a lower patch 402 and an upper patch 404. The lower patch 402 may be placed proximately beneath the upper patch 404 (e.g., coaxially). In such a configuration, the lower patch 402 is positioned closer or more substantially within the internal cavity than the upper patch 404. In implementations, the lower patch 402 is located in the interior cavity of the electronic device 102 and embodied on an FPCB operably coupled to the PCBA. In other implementations, the lower patch 402 is embodied directly on the PCBA. Further, the lower patch 402 may be configured for ultra-wideband channel 5 resonance (e.g., 6489.6 megahertz).

Further illustrated in FIG. 4, the upper patch 404 is integrated in a housing component of the mechanical frame of the electronic device 102. The upper patch may be configured for ultra-wideband channel 9 resonance (e.g., 7987.2 megahertz). The housing component may be composed of any of a variety of metals. In an implementation, the housing component is composed of a polished aluminum alloy. In some implementations, the upper patch 404 may be defined in the housing component by a through-cut, shaping a substantially rectangular protrusion. During manufacturing, the through-cut may be achieved through semi-notching metalworking techniques. The through-cut may additionally define a gap 406 in the housing component. In some cases, the gap 406 may be filled with non-conductive plastic.

In addition to the above descriptions, the lower patch 402 and the upper patch 404 may be any of a variety of sizes and shapes, located anywhere within the electronic device 102.

Further, the composite antenna 122 can satisfy ultra-wideband bandwidth requirements by achieving a greater than 500-megahertz bandwidth. The lower patch 402 and the upper patch 404 of the composite antenna 122 may be operably coupled to the PCBA through an electrical feedline. The electrical feedline may be configured to pass radio-frequency current to the set of antenna patches. The lower patch 402 and the upper patch 404 may also be operably coupled to an electrical ground. In implementations, the operable coupling is implemented as surface mount technology (SMT) spring contacts. The spring contacts can provide flexible electrical connections, as well as provide mechanical support to the set of antenna patches.

Figure 5A:
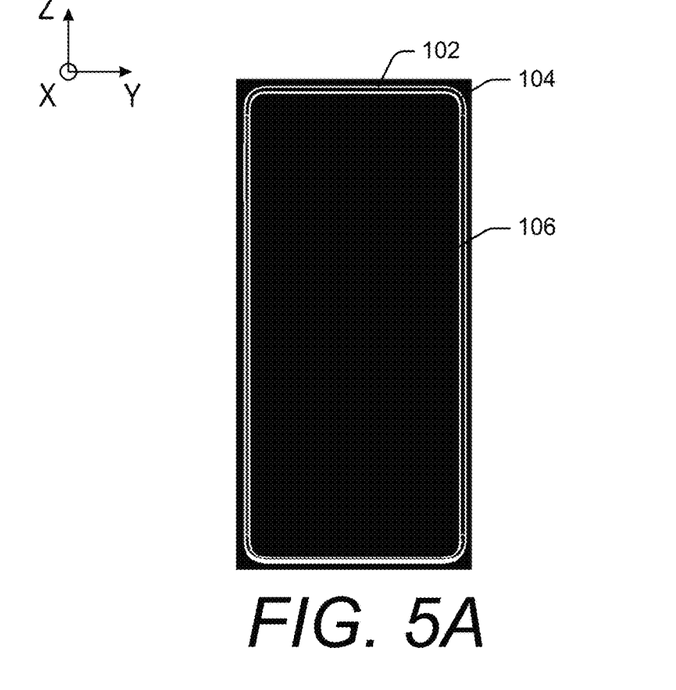
FIGS. 5A and 5B illustrate a front-facing view and rear-facing view, respectively, of a second example electronic device having a mechanical frame with an integrated composite antenna component.
Figure 5B:
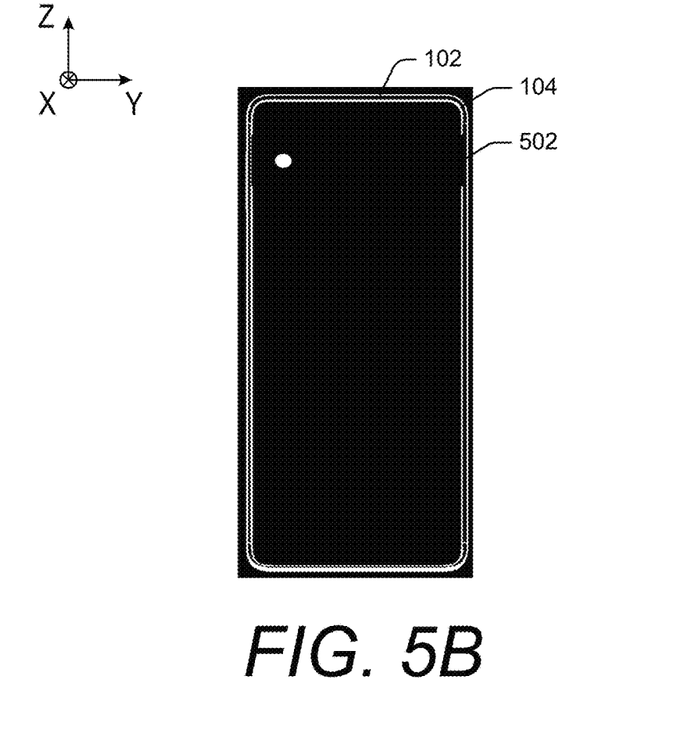

FIGS. 5A and 5B illustrate a front-facing view and rear-facing view, respectively, of a second example electronic device 102 having a mechanical frame with an integrated composite antenna component. FIGS. 5A and 5B are described in context of FIG. 1, including one or more components of FIG. 1. As illustrated, the electronic device 102 is a smartphone including the mechanical frame 104 and the display 106. The mechanical frame 104 provides an overall shape of the device and further defines the internal cavity, housing the PCBA. The mechanical frame 104 of the electronic device 102 further includes a raised housing region located on the rear of the device, as illustrated in FIG. 5B. The raised housing region houses sensors (e.g., cameras), as well as other electronic components, and is referred to herein as a rear camera bar 502 (e.g., a visor). The rear camera bar 502 includes at least one housing component.

As described herein, components referred to as upper or lower are described in context to FIG. 5B. A component is described as upper if on the x-axis the component is positioned further away from the internal cavity relative to another component. A component is described as lower if on the x-axis the component is positioned closer to the internal cavity relative to another component.

Figure 6A:
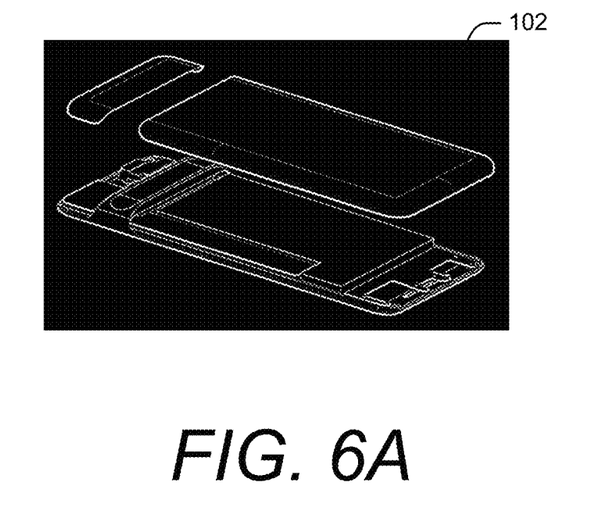
FIGS. 6A and 6B illustrate the removal of rear housing components from the second example electronic device.
Figure 6B:
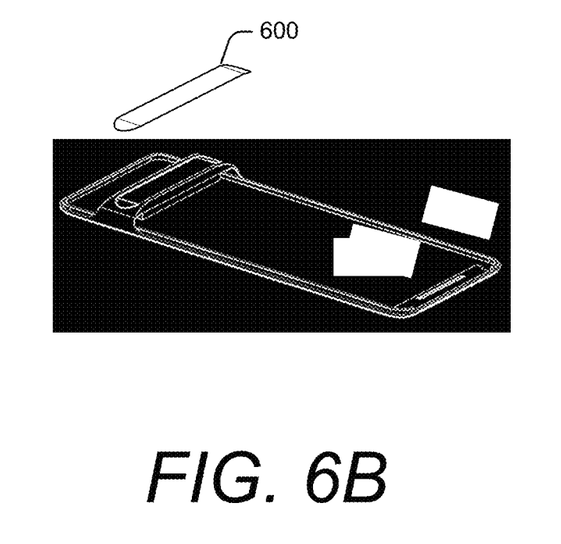

FIG. 6A illustrates the removal of housing components from the rear of the second example electronic device 102 illustrated in FIG. 5B. As illustrated, two housing components are removed from the electronic device 102. FIG. 6B illustrates a rear camera bar housing component 600 removed from a rear camera bar (e.g., rear camera bar 502). The rear camera bar housing component 600 shelters the electronic components in the rear camera bar.

Figure 7A:
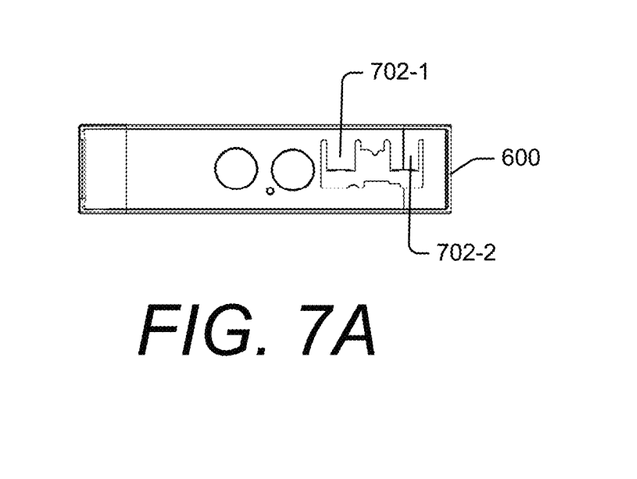
FIGS. 7A and 7B illustrate components of a composite antenna included in the second example electronic device.
Figure 7B:
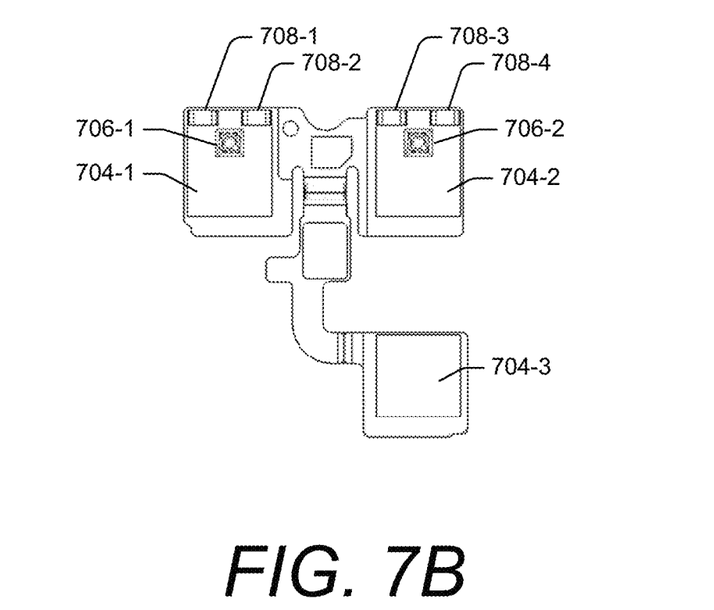

FIGS. 7A and 7B illustrate components of a composite antenna included in the second example electronic device 102. In implementations, the electronic device 102 includes a planar inverted-F antenna (PIFA) module having multiple sets of co-located antenna patches. Through such an implementation, the composite antenna is configured to measure an angle of arrival of incoming signals. FIG. 7A illustrates the rear camera bar housing component 600 having two upper patches 702 (e.g., upper patch 702-1, upper patch 702-2). The upper patches 702 may be defined in the rear camera bar housing component 600 by a through-cut, shaping substantially rectangular protrusions. The upper patches 702 may be configured for ultra-wideband channel 9 resonance (e.g., 7987.2 megahertz).

FIG. 7B illustrates three lower patches 704 (e.g., lower patch 704-1, lower patch 704-2, lower patch 704-3). The lower patch 704-3 may be included to enable the electronic device 102 to determine the angle of arrival of incoming signals from three dimensions. Lower patch 704-1 and lower patch 704-2 may include SMT contact springs for electrical feedlines 706 (e.g., electrical feedline 706-1, electrical feedline 706-2) and electrical grounds 708 (e.g., electrical ground 708-1, electrical ground 708-2, electrical ground 708-3, electrical ground 708-4). The lower patches 704 may be configured for ultra-wideband channel 5 resonance (e.g., 6489.6 megahertz). Further, the lower patch 704-1 and lower patch 704-2 may be positioned proximately beneath the upper patch 702-1 and the upper patch 702-2, respectively.

Figure 8:
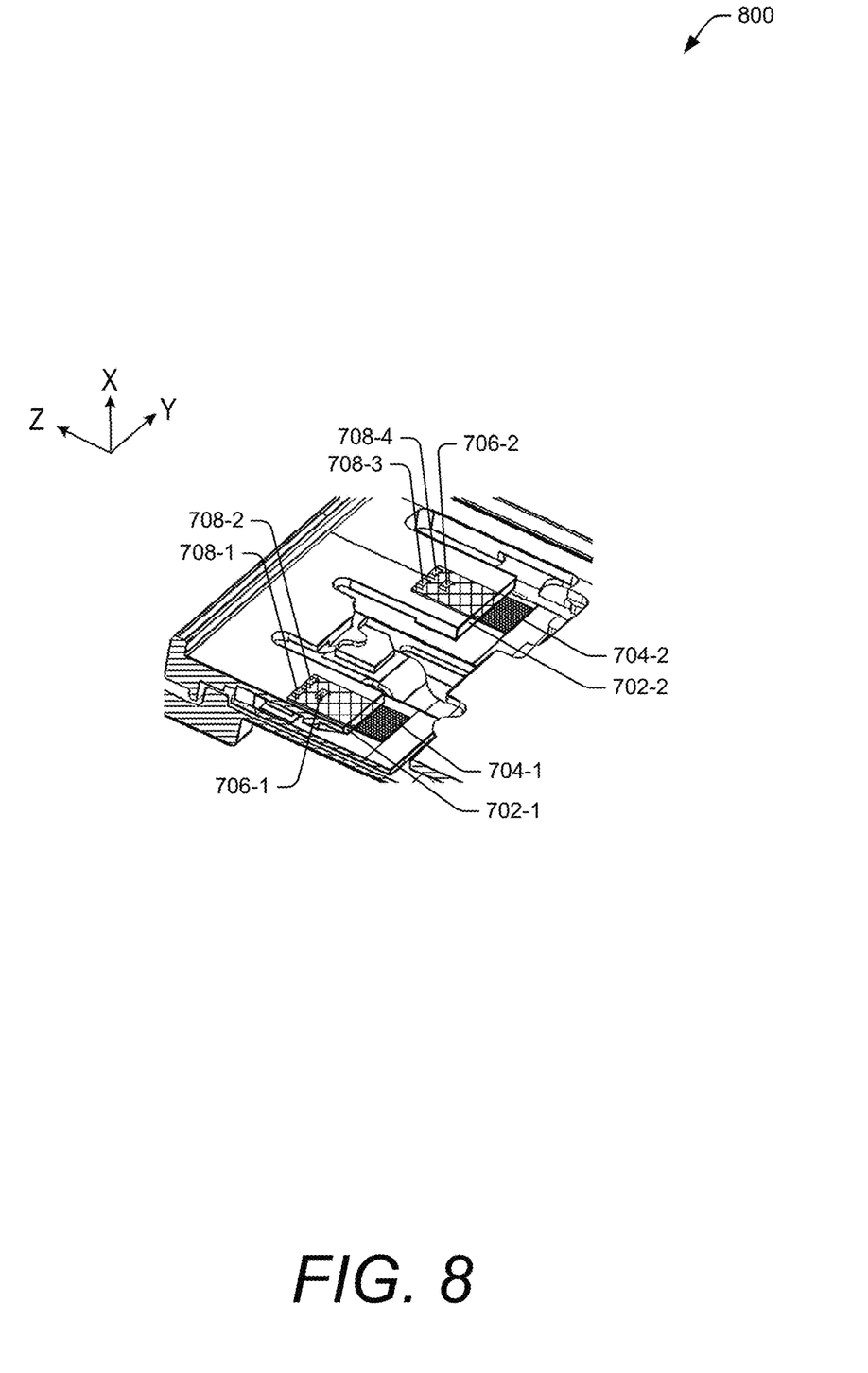
FIG. 8 illustrates a partial, cross-sectional view of the second example electronic device in accordance with one or more aspects described herein.

FIG. 8 illustrates a partial, cross-sectional view 800 of the second example electronic device 102. As illustrated, the electronic device 102 includes a PIFA module having multiple sets of co-located antenna patches. The antenna patches include upper patch 702-1, upper patch 702-2, lower patch 704-1, and lower patch 704-2. The lower patches 704 may be placed proximately beneath the upper patches 702 (e.g., coaxially). In such a configuration, the lower patch 402 is positioned closer or more substantially within the internal cavity than the upper patch 404. In implementations, as illustrated in FIG. 8, the electrical feedlines 706 (e.g., electrical feedline 706-1, electrical feedline 706-2) and/or the electrical grounds 708 (e.g., electrical ground 708-1, electrical ground 708-2, electrical ground 708-3, electrical ground 708-4) can be implemented as SMT spring contacts. These SMT spring contacts can be configured to provide mechanical support to the composite antenna (e.g., the upper patches 702).

In addition to the above descriptions, the lower patches 704 and the upper patches 702 may be any of a variety of sizes and shapes. In such an implementation, the distance between the lower patches 704 and the upper patches 702 may range anywhere from 0.4 millimeters to 3 millimeters, minimizing a package size of the composite antenna in the electronic device 102. In addition, the composite antenna can satisfy ultra-wideband bandwidth requirements by achieving a greater than 500-megahertz bandwidth.

What is claimed is:

1. An electronic device comprising:
    a mechanical frame including one or more housing components configured to house electronic components, the one or more housing components comprising a raised housing region that extends from a rear surface of the electronic device and divides, at least in part, two coplanar housing components of the one or more housing components; and
    a composite antenna, the composite antenna including at least one set of co-located antenna patches forming two resonance frequencies, the set of co-located antenna patches disposed within the raised housing region, the set of co-located antenna patches including:
        one or more upper patches, the one or more upper patches formed integral to one of the housing components and each of the one or more upper patches operably connected to one or more electrical grounds; and
        one or more lower patches, the one or more lower patches positioned proximately beneath each of the one or more upper patches, and wherein each of the one or more lower patches are operably connected to the one or more electrical grounds and each of the one or more upper patches through the one or more feedlines.

2. The electronic device as recited in claim 1, wherein the mechanical frame includes a metal housing component configured to attach to a backside of the electronic device, the metal housing component being an aluminum alloy defining a rear camera bar.

3. The electronic device as recited in claim 2, wherein the one or more upper patches is are defined in the metal housing component by a through-cut, shaping a substantially rectangular protrusion.

4. The electronic device as recited in claim 1, wherein the composite antenna includes two or more sets of co-located antenna patches configured to measure an angle of arrival of incoming signals.

5. The electronic device as recited in claim 1, wherein each of the one or more upper patches and one or more lower patches are distanced proximately 0.4 millimeters to 3 millimeters.

6. The electronic device as recited in claim 1, wherein the composite antenna is an ultra-wideband planar inverted F-antenna.

7. The electronic device as recited in claim 1, wherein the at least one set of antenna patches are operably coupled to each other via the one or more feedlines, the one or more feedlines configured to pass radio-frequency current to the antenna patches.

8. The electronic device as recited in claim 1, wherein the one or more feedlines and the one or more electrical grounds are implemented as surface mount technology (SMT) spring contacts.

9. The electronic device as recited in claim 8, wherein the SMT spring contacts are configured to provide mechanical support to the composite antenna.

* * * * *

UNITED STATES PATENT AND TRADEMARK OFFICE
CERTIFICATE OF CORRECTION

PATENT NO. : 11,777,218 B2
APPLICATION NO. : 17/563226
DATED : October 3, 2023
INVENTOR(S) : Ling-Chen Wei and Wei-Yang Wu It is certified that error appears in the above-identified patent and that said Letters Patent is hereby corrected as shown below:

In the Claims

Column 6, Line 65, after "patches" before "are" delete "is"

Signed and Sealed this
Seventh Day of November, 2023

Katherine Kelly Vidal
*Director of the United States Patent and Trademark Office*